US012443142B2

(12) United States Patent
Stranczl

(10) Patent No.: US 12,443,142 B2
(45) Date of Patent: Oct. 14, 2025

(54) HEAD-TO-TAIL FLEXIBLE GUIDE ASSEMBLY FOR A HOROLOGICAL MOVEMENT, IN PARTICULAR FOR A DISPLAY DEVICE

(71) Applicant: Montres Breguet S.A., L'Abbaye (CH)

(72) Inventor: Marc Stranczl, Nyon (CH)

(73) Assignee: Montres Breguet S.A., L'Abbaye (CH)

( * ) Notice: Subject to any disclaimer, the term of this patent is extended or adjusted under 35 U.S.C. 154(b) by 385 days.

(21) Appl. No.: 18/062,751

(22) Filed: Dec. 7, 2022

(65) Prior Publication Data

US 2023/0195034 A1 Jun. 22, 2023

(30) Foreign Application Priority Data

Dec. 22, 2021 (EP) .................................... 21216986

(51) Int. Cl.
*G04B 15/14* (2006.01)
*G04B 19/253* (2006.01)
*G04B 19/26* (2006.01)

(52) U.S. Cl.
CPC .......... *G04B 15/14* (2013.01); *G04B 19/2536* (2013.01); *G04B 19/268* (2013.01)

(58) Field of Classification Search
CPC .. G04B 15/14; G04B 19/2536; G04B 19/268; G04B 17/045; G04B 19/082; G04B 13/00; G04B 19/262
See application file for complete search history.

(56) References Cited

U.S. PATENT DOCUMENTS

| | | | | |
|---|---|---|---|---|
| 9,201,398 | B2 * | 12/2015 | Cusin | G04B 17/063 |
| 10,216,146 | B2 * | 2/2019 | Chabloz | G04B 13/00 |
| 12,055,896 | B2 * | 8/2024 | Mabillard | G04B 5/185 |
| 2022/0163922 | A1 | 5/2022 | Zaugg | |

FOREIGN PATENT DOCUMENTS

| | | | |
|---|---|---|---|
| CH | 716 725 | A2 | 4/2021 |
| EP | 2 998 800 | A2 | 3/2016 |
| EP | 3 919 988 | A1 | 12/2021 |
| EP | 4 002 016 | A1 | 5/2022 |
| WO | WO 2020/016131 | A1 | 1/2020 |

OTHER PUBLICATIONS

European Search Report issued Jun. 1, 2022 in European Application 21216986.6, filed on Dec. 22, 2021 (with English Translation of Categories of Cited Documents), 3 pages.

* cited by examiner

*Primary Examiner* — Edwin A. Leon
(74) *Attorney, Agent, or Firm* — Oblon, McClelland, Maier & Neustadt, L.L.P.

(57) ABSTRACT

A flexible guide assembly for a horological movement, in particular for a display device of the horological movement, the assembly including two flexible guides arranged in series in a substantially head-to-tail manner, the first flexible guide including a support and a first movable element that is capable of moving relative to the support, as well as a first elongate, flexible body connecting the support to the first movable element, such that the first movable element can move by bending the first elongate, flexible body in a circular motion, the second flexible guide including a second movable element capable of moving relative to the first movable element and to the support of the first flexible guide, a second elongate, flexible body connecting the second movable element to the first movable element.

18 Claims, 6 Drawing Sheets

HEAD-TO-TAIL FLEXIBLE GUIDE ASSEMBLY FOR A HOROLOGICAL MOVEMENT, IN PARTICULAR FOR A DISPLAY DEVICE

CROSS-REFERENCE TO RELATED APPLICATION

This application claims priority to European Patent Application No. 21216986.6 filed on Dec. 22, 2021, the entire disclosure of which is hereby incorporated herein by reference.

TECHNICAL FIELD OF THE INVENTION

The present invention relates to a head-to-tail flexible guide assembly for a horological movement, in particular for a display device. The invention further relates to a horological movement provided with such a flexible guide assembly.

TECHNOLOGICAL BACKGROUND

Innovations in flexible guides are opening up new perspectives in horological movements, in particular because they act as a return spring. For example, they are used in horological resonator mechanisms in place of the balance spring to actuate the balance. Applications are also known in the field of strike mechanisms, in particular to actuate hammers.

Admirers of horological complications appreciate a certain animation of the displays of a timepiece, which can be provided by retrograde display mechanisms, or by tourbillon mechanisms or the like, which also guarantee better positional insensitivity.

A retrograde horological display mechanism is said to be one which, having reached an extreme position, goes backwards and returns to its starting point. Among the retrograde horological display mechanisms known, mention can in particular be made of the retrograde date display mechanisms, an example whereof is given by a display hand which moves to face an index on which the date indications from "1" to "31" appear. The display hand points successively to each of the date indications "1" to "31" and then at the end of the month when it reaches the date indication "31", it is moved backwards and brought to face the date indication "1". The display hand then starts moving to again face the date indications from "1" to "31".

Flexible guides also allow for innovative mechanism architectures in display devices. For example, the European patent document No. 3514633 describes a retrograde display mechanism, wherein flexible guides are used as return springs.

However, certain drawbacks remain, in particular the number and complexity of the assembly of the parts present, as well as the risk of blockage. Moreover, these flexible guide mechanisms occupy a large volume within the movement. More specifically, for example, the flexible guides of the European patent document No. 3514633 occupy a large surface area within the plane of the watch. The European patent document No. 3637196A1 discloses another assembly of flexible guides arranged in series. A plurality of guides are stacked in series in a z-shaped arrangement in order to increase the angular working range of the flexible guide assembly. However, this has the drawback of significantly increasing the overall dimensions of these devices.

SUMMARY OF THE INVENTION

One purpose of the invention is thus to propose a head-to-tail flexible guide assembly for a horological movement that does not suffer from the aforementioned problems.

To this end, the invention relates to a flexible guide assembly for a horological movement, in particular for a display device of the horological movement, the assembly comprising two flexible guides arranged in series in a substantially head-to-tail manner, the first flexible guide comprising a support and a first element that is capable of moving relative to the support, as well as a first elongate, flexible body connecting the support to the first movable element, such that the first movable element can move by bending the first elongate, flexible body in a circular motion, the second flexible guide comprising a second element capable of moving relative to the first movable element and to the support of the first flexible guide, a second elongate, flexible body connecting the second movable element to the first movable element, such that the second movable element can move relative to the first movable element by bending the second elongate, flexible body in a circular motion.

The flexible guide assembly is noteworthy in that the first elongate, flexible body and the second elongate, flexible body extend and are flexible in the same first plane.

The invention results in a flexible guide assembly with sufficient angular travel, which retains a reduced compactness. More specifically, the arrangement of two flexible guides in series increases the angular travel. However, the head-to-tail arrangement of the two flexible guides avoids any increase in the extent of the assembly. Moreover, the fact that the two elongate, flexible bodies are in the same plane further increases the compactness of the assembly in the thickness of the assembly, because the elongate, flexible bodies do not belong to different planes. Thus, the two flexible guides are nested inside one another to save space.

According to one specific embodiment, the first flexible guide comprises a third elongate, flexible body, and the second flexible guide comprises a fourth elongate, flexible body.

According to one specific embodiment, the third elongate, flexible body and the fourth elongate, flexible body extend and are flexible in the same second plane.

According to one specific embodiment, the second plane is substantially parallel to the first plane.

According to one specific embodiment, the first and third elongate, flexible bodies are crossed.

According to one specific embodiment, the second and fourth elongate, flexible bodies are crossed.

According to one specific embodiment, the second movable element can move between a first rest position and a first position of maximum extension relative to the support.

According to one specific embodiment, the support and the second movable element are for the most part superimposed on one another in the first rest position of the assembly.

According to one specific embodiment, the support and the second movable element include first stop means to prevent the second movable element from moving beyond the first position of maximum extension.

According to one specific embodiment, the first movable element can move between a second rest position and a second position of maximum extension of the first movable element relative to the support, the assembly including second stop means to prevent the second movable element from moving beyond the second position of maximum extension.

According to one specific embodiment, the second movable element includes a meshing toothing to allow a gear wheel to move the second movable element relative to the first movable element and to the support.

According to one specific embodiment, the gear wheel is arranged such that the spurious radial movement does not interfere with the meshing of the meshing toothing.

According to one specific embodiment, the assembly comprises at least two superimposed layers assembled one on top of the other, each layer including a portion of the support, a portion of the first movable element and a portion of the second movable element.

According to one specific embodiment, the first layer comprises the first elongate, flexible body and the third elongate, flexible body, and the second layer comprises the second elongate, flexible body and the fourth elongate, flexible body.

According to one specific embodiment, the elongate, flexible bodies are flexible blades, optionally comprising a rigid section.

According to one specific embodiment, the angular travel of the second movable element is comprised in the range of 5° to 90°, preferably of 10° to 45°.

The invention further relates to a retrograde-type display device, in particular for a horological movement, characterised in that it comprises at least one flexible guide assembly according to the invention.

The invention further relates to a horological movement comprising such a flexible guide assembly.

BRIEF DESCRIPTION OF THE FIGURES

The purposes, advantages and features of the present invention will appear after reading several embodiments, which are provided for purposes of illustration only and not intended to limit the scope of the invention, given with reference to the accompanying drawings, wherein.

DETAILED DESCRIPTION OF THE INVENTION

Figure 1:
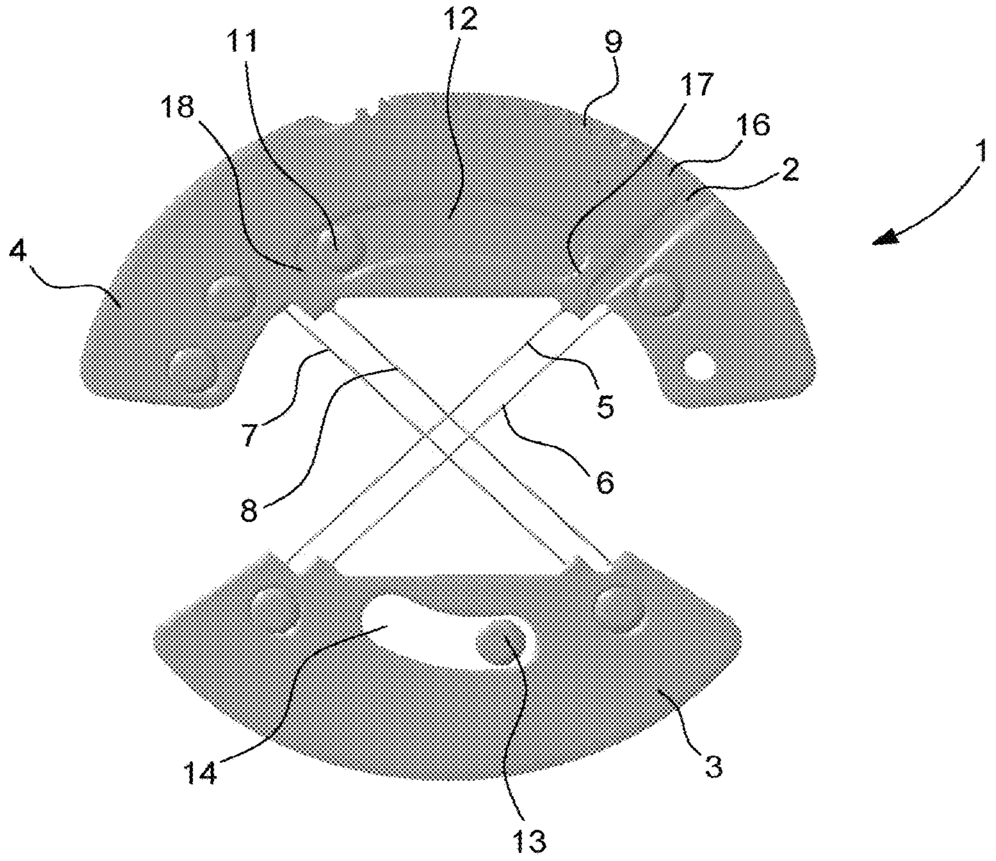
FIG. 1 is a diagrammatic, overhead view of a flexible guide assembly according to a first embodiment of the invention in the rest position.

FIGS. 1 to 4 show a flexible guide assembly 1 for a horological movement, in particular for a display device of the horological movement. The flexible guide assembly is, for example, arranged on a plate of the horological movement.

The assembly 1 comprises two flexible guides arranged in series in a substantially head-to-tail manner. Thus, the two flexible guides are oriented substantially in opposite directions to one another when the assembly 1 is in the rest position. Moreover, they are at least partly superimposed.

A first flexible guide comprises a support 2 and a first movable element 3 capable of moving relative to the support 2, as well as a first elongate, flexible body 6 connecting the support 2 to the first movable element 3, such that the first movable element 3 can move by bending the first elongate, flexible body 6 in a circular motion relative to the support 2. The support 2 is preferably unable to move relative to the plate.

A second flexible guide comprises a second movable element 4 capable of moving relative to the first movable element 3 and to the support 2 of the first flexible guide. The second flexible guide comprises a second elongate, flexible body 5 connecting the second movable element 4 to the first movable element 3, such that the second movable element 4 can move relative to the first movable element 3 by bending the second elongate, flexible body 5 in a circular motion. The second movable element 4 also moves relative to the support 2.

The first flexible guide comprises a third elongate, flexible body 8 connecting the support 2 to the first movable element 3, and the second flexible guide comprises a fourth elongate, flexible body 7 connecting the second movable element 4 to the first movable element 3.

The elongate, flexible bodies 5, 6, 7, 8 are preferably flexible blades. The first and third elongate, flexible bodies 6, 8 are crossed to form a flexible cross-blade guide. The second and fourth elongate, flexible bodies 5, 7 are crossed to form a flexible cross-blade guide.

The second movable element 4 can move between a first rest position and a first position of maximum extension of the second movable element 4 relative to the support 2. The first movable element 3 can move between a second rest position and a second position of maximum extension of the first movable element 3 relative to the support 2.

The support 2, the first movable element 3 and the second movable element 4 each have a substantially planar shape with a geometry in the shape of an arc of a circle having a substantially curved outer edge. The support 2, the first movable element 3 and the second movable element 4 have substantially equal dimensions.

The two flexible guides are partly superimposed on one another for compactness. Thus, the support 2 and the second movable element 4 are for the most part superimposed on one another when the assembly is in the rest position. Preferably, the second movable element 4 moves above the support 2.

According to the invention, the first elongate, flexible body 6 and the second elongate, flexible body 5 extend and are flexible in the same first plane. Moreover, the third elongate, flexible body 8 and the fourth elongate, flexible body 7 extend and are flexible in the same second plane.

The second plane is substantially parallel to the first plane. Thus, all the blades of the two flexible guides belong to only two planes, thus preventing the assembly from having a too large thickness.

More specifically, the crossed blades of the two flexible guides are substantially parallel to one another in pairs when the flexible guide assembly 1 is in the rest position. The first 6 and second 5 elongate, flexible bodies are substantially parallel when the flexible guide assembly 1 is in the rest position. The third 7 and fourth 8 elongate, flexible bodies are substantially parallel when the flexible guide assembly 1 is in the rest position.

Moreover, the flexible guide assembly 1 includes first stop means to prevent the second movable element 4 from moving beyond the first position of maximum extension. The first stop means comprise a first screw 11 extending perpendicularly from the support. The first stop means further comprise a first opening 12 arranged through the second movable element 4. The first screw 11 cooperates with said first opening 12 so as to allow the second movable element 4 to move relative to the support 2, and to retain it in the position of maximum extension of the second movable element 4.

To this end, said first opening 12 has an elongate shape that is substantially curved in the longitudinal direction of the second movable element 4, and with a width substantially corresponding to that of the first screw 11. Thus, the first screw 11 is held laterally in the first opening 12. The first opening 12 has a length that corresponds to the angular travel of the second movable element 4 relative to the support 2, between the first rest position and the first position of maximum extension. In the rest position, the first screw 11 is close to a proximal end 18 of the first opening 12, whereas in the position of maximum extension, the first screw 11 is close to a distal end 17 of the first opening 12. Between the two ends 17, 18, the first screw 11 slides along the first opening 12. In this way, the distal end 17 or proximal end 18 never comes into contact with the first screw 11, unless the desired travel is exceeded. If this is exceeded, the first screw 11 comes into contact with the distal end 17 or proximal end 18. In this way, this first screw 11 does not create any contact.

The assembly 1 includes second stop means to prevent the second movable element 4 from moving beyond the second position of maximum extension. The second stop means comprise a second opening 14 arranged in the first movable element 3, as well as a second screw 13 intended to be arranged on the plate of the movement. The second opening has a shape that cooperates with the second screw 13 in a similar way to that of the first stop means. The second opening 14 has an elongate shape that is substantially curved in the longitudinal direction of the first movable element 3, with a width corresponding to that of the second screw 13, and with a length corresponding to the angular travel of the first movable element 3 relative to the support 2, between the second rest position and the second position of maximum extension of the first movable element 3.

In order to actuate the assembly 1, the second movable element 4 includes a meshing toothing 9 to allow a gear wheel to move the second movable element 4 relative to the first movable element 3 and to the support 2. The meshing toothing 9 extends along the outer edge of the second movable element 4. Thus, a gear wheel meshes with the meshing toothing 9 of the second movable element 4 to move it relative to the support 2. In the figures, the second movable element 4 moves laterally away from the support 2 when the meshing toothing 9 is actuated.

Figure 2:
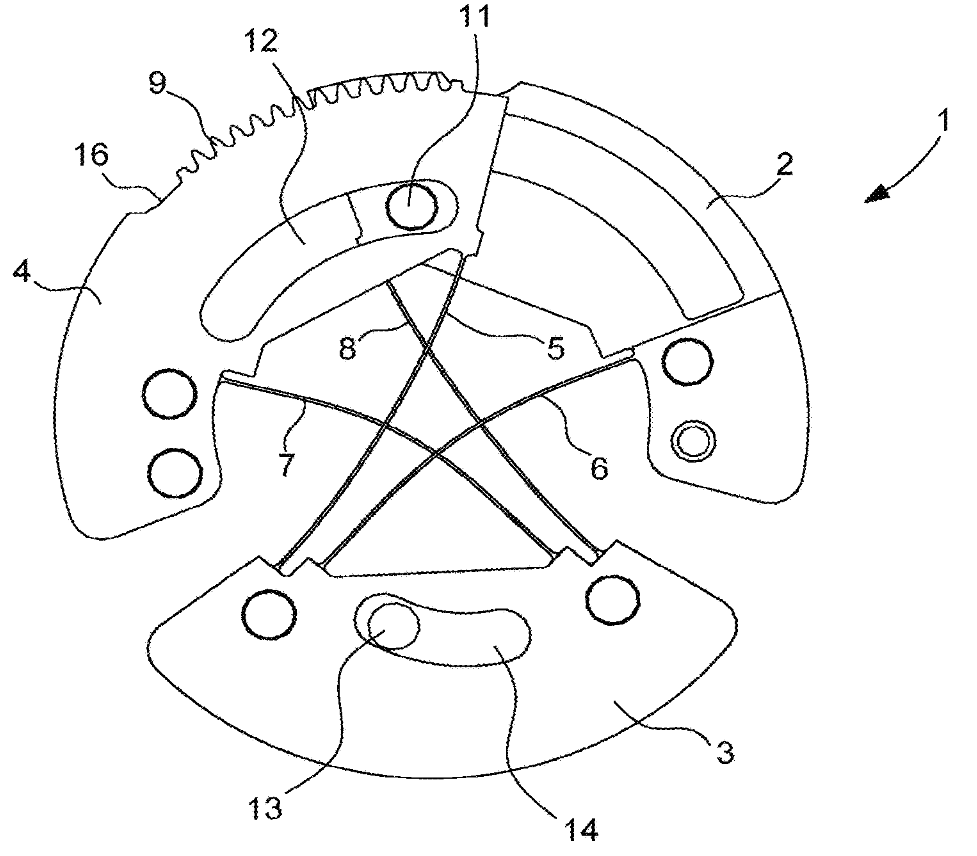
FIG. 2 is a diagrammatic, overhead view of the first embodiment of the flexible guide assembly in the position of maximum extension.
Figure 3:
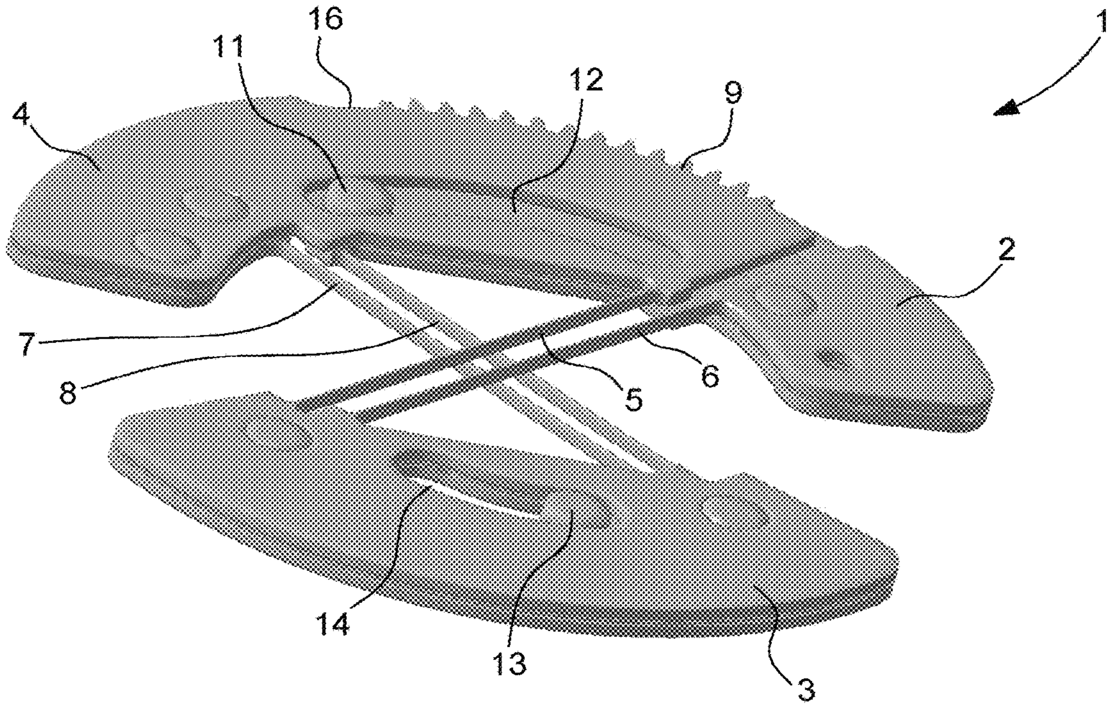
FIG. 3 is a diagrammatic, perspective view of the first embodiment of the flexible guide assembly in the rest position.
Figure 4:
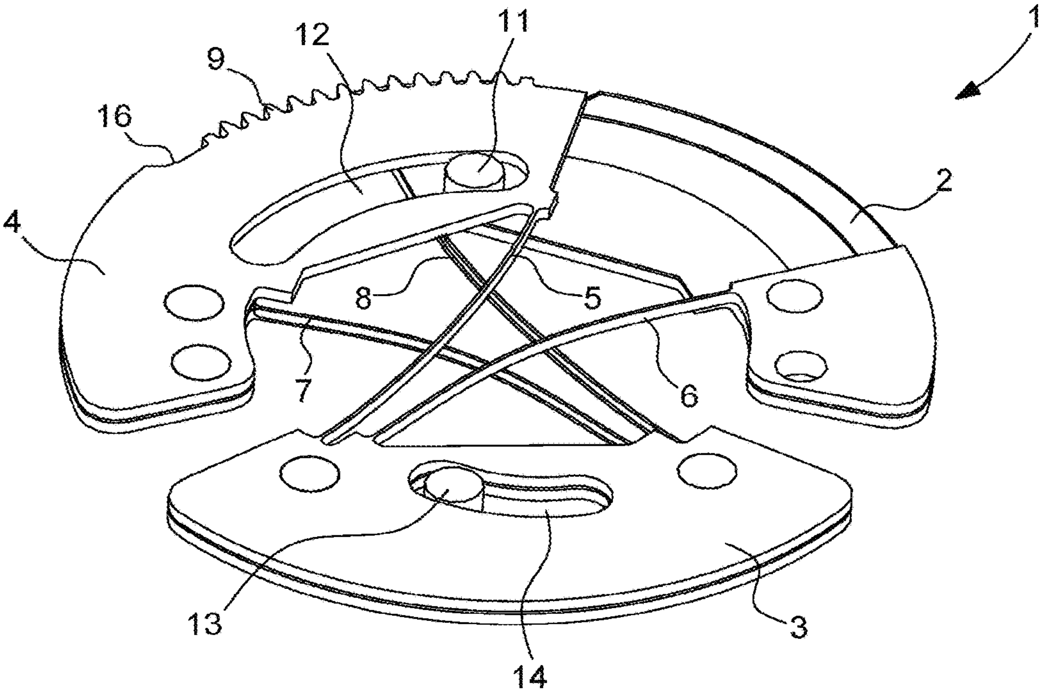
FIG. 4 is a diagrammatic, perspective view of the first embodiment of the flexible guide assembly in the position of maximum extension.

FIGS. 2 and 4 show the assembly 1 wherein the first 3 and the second movable element 4 are arranged in their respective positions of maximum extension. In this situation, the screws 11, 13 of each stop means are in the distal position 17 inside each opening 12, 14. The flexible blades are curved in the first or second plane by the force generated by the movement of the first 3 and of the second movable element 4.

In this configuration of maximum extension, the first 6 and the second elongate, flexible body 5 move away from one another, starting from the first movable element 3 as far as the support 2 for the first body 6, and starting from the first movable element 3 as far as the second movable element 4 for the second elongate, flexible body 5. The third 8 and the fourth elongate, flexible body 7 move away from one another, starting from the first movable element 3 as far as the second movable element 4 for the fourth elongate, flexible body 7, and starting from the first movable element 3 as far as the support 2 for the third elongate, flexible body 8.

Figure 5:
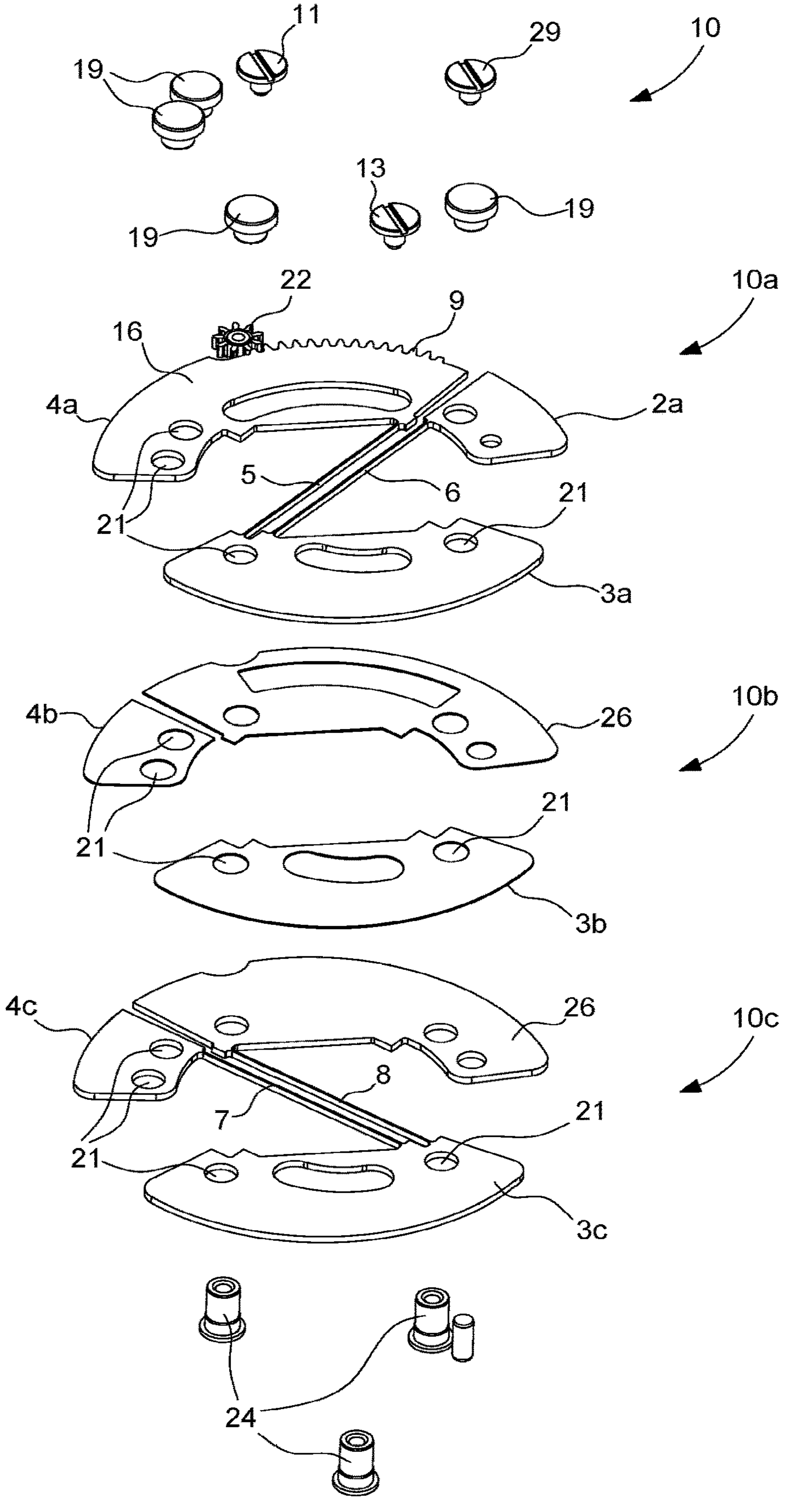
FIG. 5 is a diagrammatic, exploded, perspective view of a flexible guide assembly comprising at least two layers according to a second embodiment of the invention.
Figure 6:
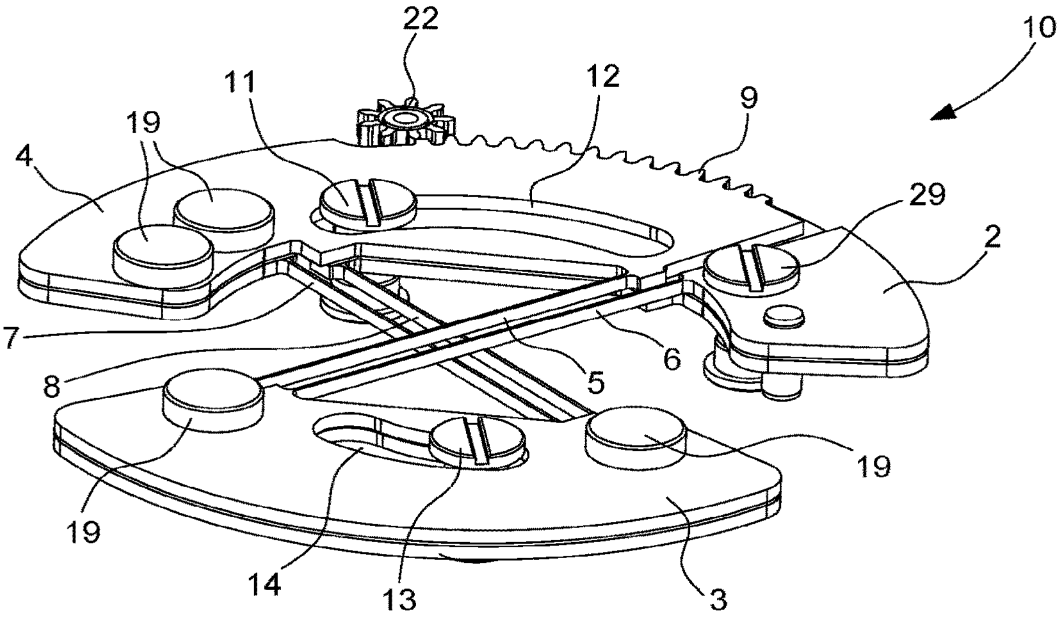
FIG. 6 is a diagrammatic, perspective view of the flexible guide assembly according to the second embodiment of the invention in an assembled state.

FIGS. 5 and 6 show a second embodiment of an assembly 10 comprising three superimposed layers **10*a*, 10*b*, 10*c* assembled with one another to form the assembly 10. Each layer 10*a*, 10*b*, 10*c* extends in a different plane, the planes preferably being parallel. Each layer 10*a*, 10*b*, 10*c* comprises a portion of the support 2, of the first movable element 3, and of the second movable element 4**.

A first layer **10*a* includes a minority portion 2*a* of the support 2, an entire portion 3*a* of the first movable element 3 and a majority portion 4*a* of the second movable element 4, as well as the first elongate, flexible body 6 and the second elongate, flexible body 5**.

A majority portion includes, for example, two thirds or three quarters of the element for said layer, whereas a minority portion includes one third or one quarter of the element for said layer.

The second layer **10*c* comprises a majority portion 2*c* of the support 2, an entire portion 3*c* of the first movable element 3 and a minority portion 4*c* of the second movable element 4, as well as the third elongate, flexible body 8 and the fourth elongate, flexible body 7. The two layers 10*a*, 10*c*** are preferably in one piece, or even made of the same material, for example silicon or a metal alloy obtained by LIGA-type electroplating or by wire cutting.

The first layer **10*a* forms the top layer of the assembly 10, whereas the second layer 10*c* forms the bottom layer of the assembly 10**.

In this embodiment, the assembly 10 includes an intermediate layer **10*b* arranged between the first layer 10*a* and the second layer 10*c* to form the movable elements 3, 4 and the support 2. This intermediate layer 10*b* has the function of spacing the two layers 10*a*, 10*c*** apart, such that the pairs of flexible blades belonging to the two different planes are further separated from one another, in particular to avoid the risk of the blades that cross one another in the two different planes from knocking against one another.

The intermediate layer **10*b* includes a thickness of material, including a majority portion 2*b* of the support 2, a minority portion 4*b* of the second movable element, and a majority portion 3*b* of the first movable element 3**.

The first layer **10*a*, the intermediate layer 10*b* and the second layer 10*c* are assembled with one another by superimposition using assembling means. The assembling means are, for example, studs 19 embedded in holes 21 formed in the different layers 10*a*, 10*b*, 10*c*. Each stud 19 cooperates with a hole 21 to hold the portions of the three layers 10*a*, 10*b*, 10*c*** together.

A third screw 29 is used to assemble the minority portion **2*a* of the support 2 to the other portions 2*b*, 2*c* of the support 2. The first 11, second 13 and third 29 screws are arranged through the layers 10*a*, 10*b*, 10*c* of the assembly 10 from above, and they each cooperate with a different nut 24 disposed beneath the assembly 10** in order to be held.

To actuate the assembly 10, the second movable element 4 includes a meshing toothing 9 to allow a gear wheel 22 to move the second movable element 4 relative to the first movable element 3 and to the support 2.

The second movable element 4 moves by rotation, as well as by a spurious radial movement which is present in most flexible guides. The position of the gear wheel 22 relative to the second movable element 4 is chosen so that the spurious movement does not interfere with the meshing of the meshing toothing 9.

FIG. 6 shows the second embodiment of the assembly 10 wherein the three layers 4*a*, 4*b*, 4*c* are assembled.

Figure 7:
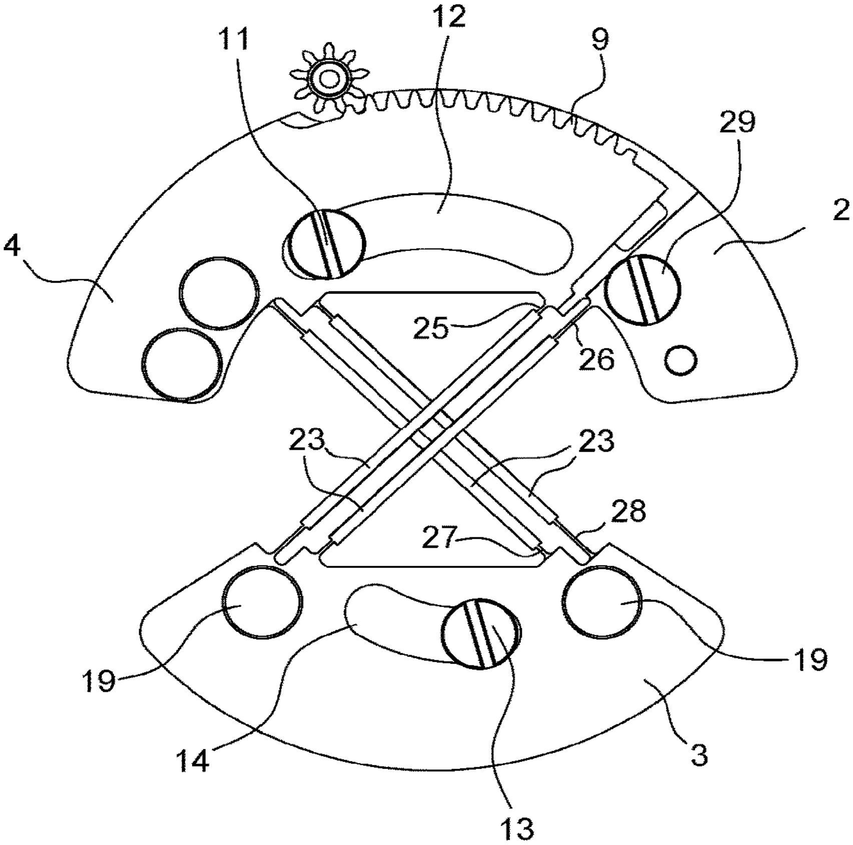
FIG. 7 is a diagrammatic, overhead view of a flexible guide assembly according to a third embodiment of the invention, and FIGS. 8*a*) to 8*e*) are diagrammatic, overhead views of a display mechanism including two guide assemblies according to the invention.

The third embodiment in FIG. 7 shows a flexible guide assembly 20 similar to that of the first embodiment, the assembly 20 comprising flexible blades provided with a rigid section 23 in the middle thereof acting as elongate, flexible bodies. The rigid sections 23 allow the rigidity of the flexible bodies to be adjusted in a direction outside of their respective plane. The small flexible blades between the rigid sections can also be replaced by flexible collars.

Figure 8A:
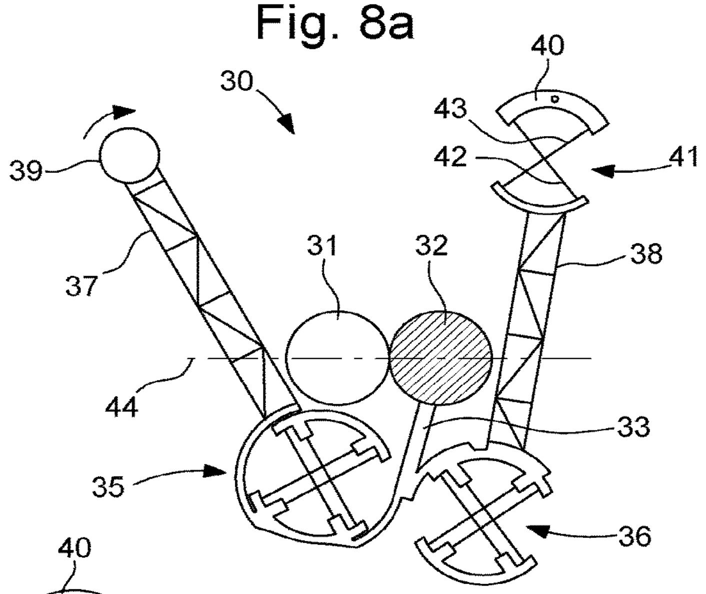

FIGS. 8*a*) to 8*e*) describe an application of a flexible guide assembly to a moon phase-type display device 30 comprising two flexible guide assemblies 35, 36 according to the invention. The display device 30 comprises a decorative piece representing a moon 31, and a movable cover 32 configured to successively conceal and reveal the moon 31 to indicate the corresponding moon phase. In this display device 30, the moon 31 is unable to move relative to the dial, and the movable cover 32 moves over the moon 31. The moon 31 and the movable cover 32 are each shaped like a disc of substantially equal diameter. The movable cover 32 is supported by a rigid rod 33 connected to each flexible guide assembly 35, 36, preferably by the second movable element of each flexible guide assembly 35, 36.

In order to actuate the movable cover 32, the display device 30 comprises a first 37 and a second 38 rigid movable arm, each arm being connected to one of the flexible guide assemblies 35, 36, preferably via the support. In this embodiment of the display device 30, the supports of each flexible guide assembly 35, 36 are not fixed, but are capable of moving with each arm 37, 38.

The first movable arm 37 includes a free end 39 for actuating the motion of the movable cover 32.

The second movable arm 38 is connected at a first end to an unmoving support 40 by means of a flexible guide 41 with crossed blades 42, 43, whereas the second end is connected to the second flexible guide assembly 36. The flexible guide 41 with crossed blades 42, 43 allows the second arm 38 to rotate about a centre of rotation.

Each flexible guide assembly 35, 36 acts as an articulation to the rod 33 to move the movable cover 32 over the moon 31.

Thanks to this display device 30, two flexible guide assemblies 35, 36 are used, which allow for transformations of motion according to the principles of the articulated mechanisms of Hoeckens, Tchebytchev, Roberts, Klann, and the like. Although the movement of these mechanisms generally occurs in the plane, in two directions (in x and y), these articulations have only one degree of freedom. A particular point in the mechanism must necessarily travel a defined trajectory. In other words, the trajectory thereof is captive, and this point has only one real degree of freedom, along this trajectory.

Examples of articulated mechanisms with articulations that are different from those of the invention are described in the European patent application No. 3919988, the operating characteristics whereof are incorporated for reference in this application.

Thus, the movable cover 32 follows a trajectory with a single degree of freedom over the moon 31. By actuating the first arm 37 of the display device 30, the movable cover 32 is moved along the trajectory with a single degree of freedom along a straight line 44.

In this display device 30, the two flexible guide assemblies 35, 36 guide the motion of the rod 33 and of the movable cover 32 along the trajectory of the single degree of freedom. By actuating the free end 39 of the first arm 37 as shown by the arrow in FIGS. 8*a*) to 8*d*), the movable cover 32 moves.

Figure 8B:
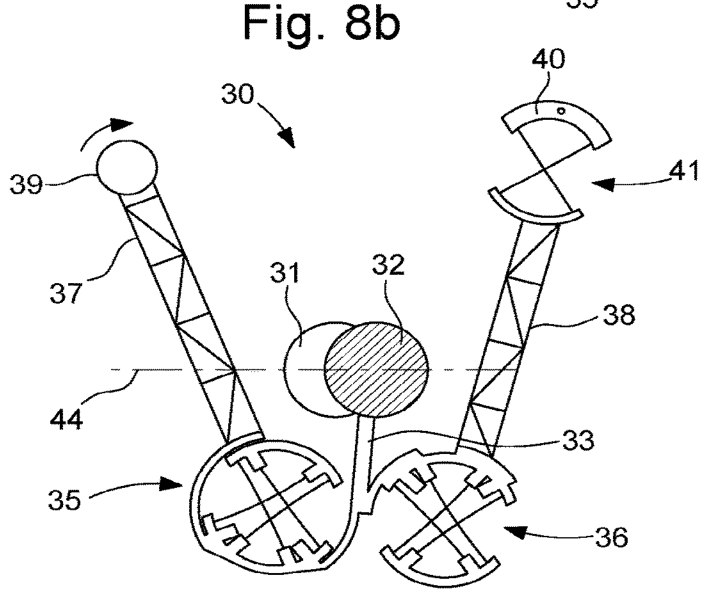
Figure 8C:
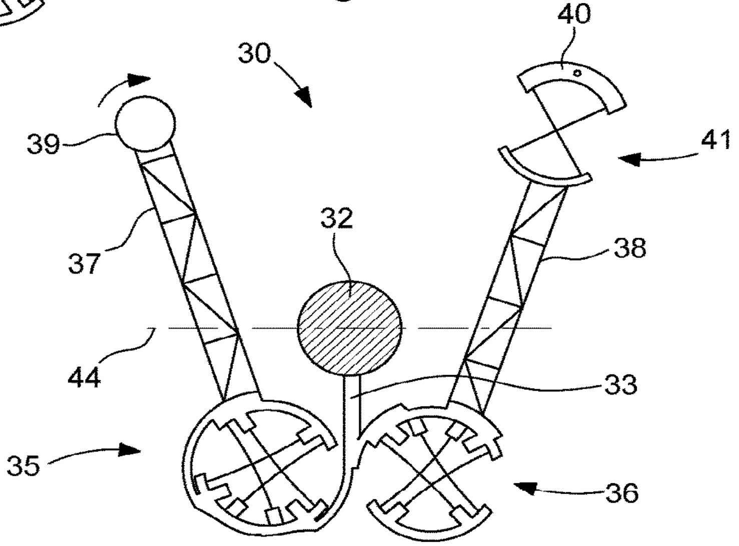
Figure 8D:
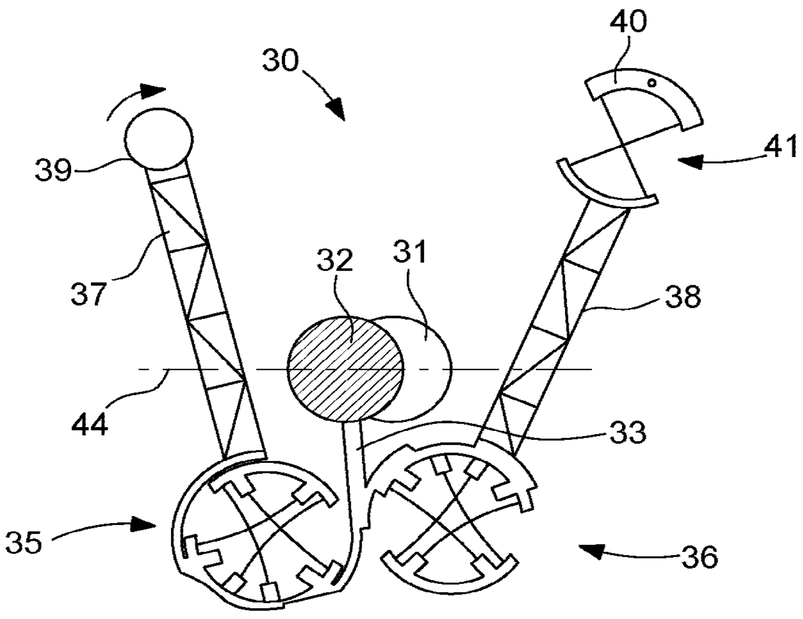
Figure 8E:
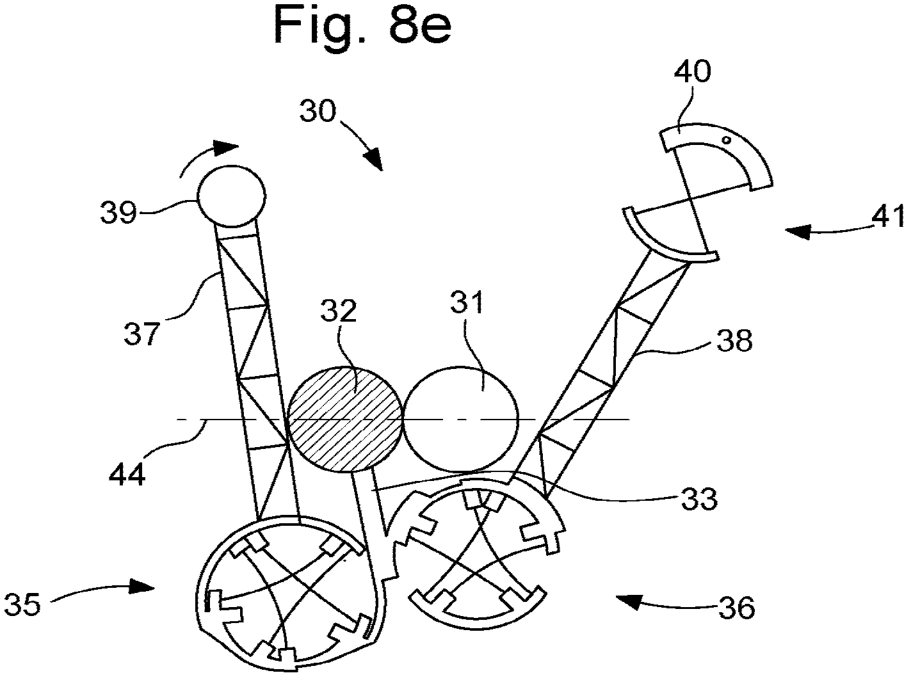

It goes without saying that, by actuating the free end 39 in the opposite direction, the movable cover 32 follows the trajectory in the opposite direction along the straight line 44. Thus, In FIG. 8*a*), the movable cover 32 is to the right of the moon 31, leaving the moon 31 fully visible. Following the trajectory with a single degree of freedom, the movable cover 32 partially covers the moon 31 in FIG. 8*b*) and then completely covers it in FIG. 8*c*) to conceal it. In FIG. 8*d*), the movable cover 32 uncovers part of the moon 32, and finally uncovers it completely in FIG. 8*e*), where the movable cover 32 is to the left of the moon 31.

It goes without saying that the invention is not limited to the embodiments described with reference to the figures and alternatives can be considered without leaving the scope of the invention.

The invention claimed is:

1. A flexible guide assembly for a horological movement for a display device of the horological movement, the assembly comprising:

a first flexible guide and a second flexible guide arranged in series, the first and second flexible guides being oriented substantially in opposite directions relative to one another when the assembly is in a rest position, wherein the first flexible guide includes a support and a first movable element that is capable of moving relative to the support, as well as a first elongate, flexible body connecting the support to the first movable element, such that the first movable element can move by bending the first elongate, flexible body in a circular motion, wherein the second flexible guide includes a second movable element capable of moving relative to the first movable element and to the support of the first flexible guide, a second elongate, flexible body connecting the second movable element to the first movable element, such that the second movable element can move relative to the first movable element by bending the second elongate, flexible body in a circular motion, and wherein the first elongate, flexible body and the second elongate flexible body extend parallel to each other in the rest position and are flexible in a same first plane.

2. The flexible guide assembly according to claim 1, wherein the first flexible guide comprises a third elongate, flexible body, and the second flexible guide comprises a fourth elongate, flexible body.

3. The flexible guide assembly according to claim 2, wherein the third elongate, flexible body and the fourth elongate, flexible body extend and are flexible in a same second plane.

4. The flexible guide assembly according to claim 3, wherein the second plane is substantially parallel to the first plane.

5. The flexible guide assembly according to claim 3, wherein the first and the third elongate, flexible bodies are crossed.

6. The flexible guide assembly according to claim 3, wherein the second and the fourth elongate, flexible bodies are crossed.

7. The flexible guide assembly according to claim 1, wherein the second movable element can move between a first rest position and a first position of maximum extension relative to the support.

8. The flexible guide assembly according to claim 1, wherein the support and the second movable element are for the most part superimposed on one another when the assembly is in the first rest position.

9. The flexible guide assembly according to claim 1, wherein the support and the second movable element include first stop means to prevent the second movable element from moving beyond the first position of maximum extension.

10. The flexible guide assembly according to claim 1, wherein the first movable element can move between a second rest position and a second position of maximum extension of the first movable element relative to the support, the assembly including second stop means to prevent the second movable element from moving beyond the second position of maximum extension.

11. The flexible guide assembly according to claim 1, wherein the second movable element includes a meshing toothing to allow a gear wheel to move the second movable element relative to the first movable element and to the support.

12. The flexible guide assembly according to claim 11, wherein the gear wheel is arranged such that the spurious radial movement does not interfere with the meshing of the meshing toothing.

13. The flexible guide assembly according to claim 1, comprising at least two superimposed layers assembled one on top of the other, each layer including a portion of the support, a portion of the first movable element and a portion of the second movable element.

14. The flexible guide assembly according to claim 13, wherein the first layer comprises the first elongate, flexible body and the third elongate, flexible body, and the second layer comprises the second elongate, flexible body and the fourth elongate, flexible body.

15. The flexible guide assembly according to claim 1, wherein the elongate, flexible bodies are flexible blades, optionally comprising a rigid section.

16. The flexible guide assembly according to claim 1, wherein an angular travel of the second movable element is comprised in the range of 5° to 90°.

17. A retrograde display device of for the horological movement, comprising at least one flexible guide assembly according to claim 1.

18. A horological movement, comprising the flexible guide assembly according to claim 1.

* * * * *